United States Patent [19]

Fox

[11] 4,236,743
[45] Dec. 2, 1980

[54] BOTTLE CARRIER

[76] Inventor: Earl W. Fox, 336 W. Valencia, Apt. B, Burbank, Calif. 91506

[21] Appl. No.: 77,558

[22] Filed: Sep. 21, 1979

[51] Int. Cl.³ ............................................. A47J 45/00
[52] U.S. Cl. .................................. 294/27 H; 294/28
[58] Field of Search ...................... 294/27 H, 28, 31.2, 294/31, 87.2; 215/100 A; 16/114 A; 224/45 A, 45 AA, 45 AB, 46 R, 45 BA, 45 H

[56] References Cited

U.S. PATENT DOCUMENTS

| | | | |
|---|---|---|---|
| 3,007,734 | 11/1961 | Terry | 294/28 |
| 3,912,140 | 10/1975 | Frangos | 294/27 H |

*Primary Examiner*—James B. Marbert
*Attorney, Agent, or Firm*—John E. Wagner

[57] ABSTRACT

A clam-shape handle for carrying bottles by their necks. The handle is pivotable outward to a narrow angular range which exceeds the maximum neck diameter of the bottle type to be carried. When opened to that angular range and slipped over the neck of a bottle it may be closed on the bottle with broad area contact. A "J" shaped locking member holds the two handle parts together by thumb pressure.

7 Claims, 7 Drawing Figures

U.S. Patent    Dec. 2, 1980    4,236,743
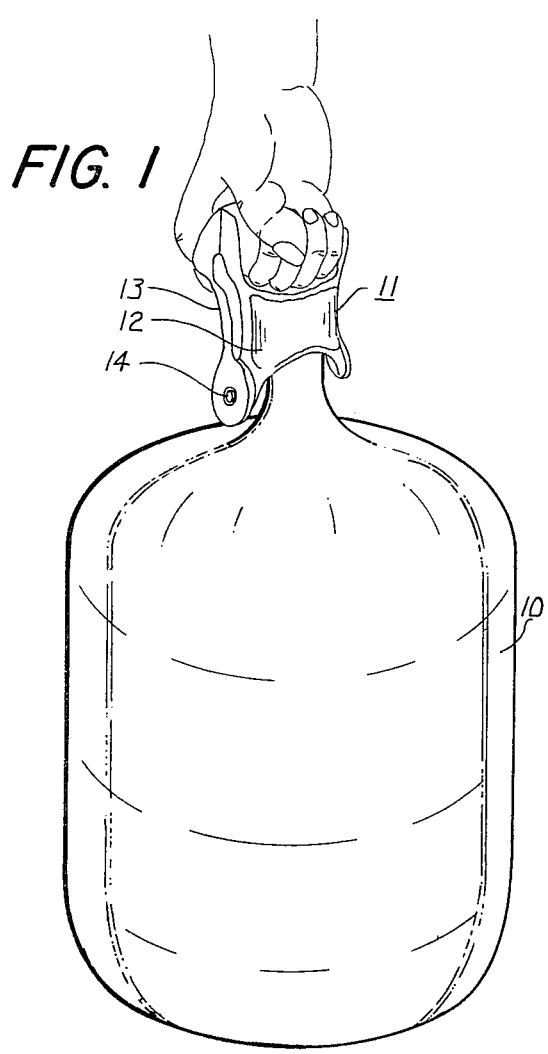
FIG. 1
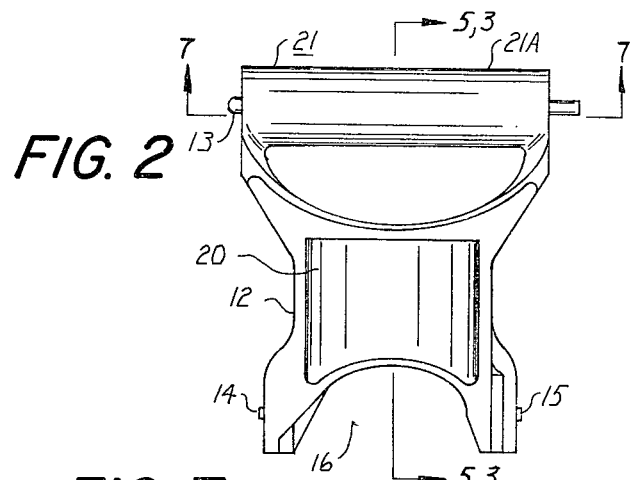
FIG. 2
FIG. 7
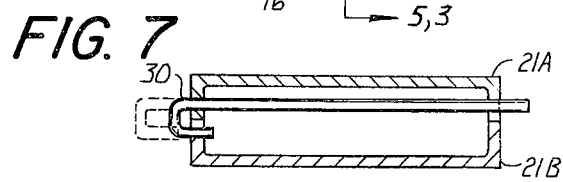
FIG. 3
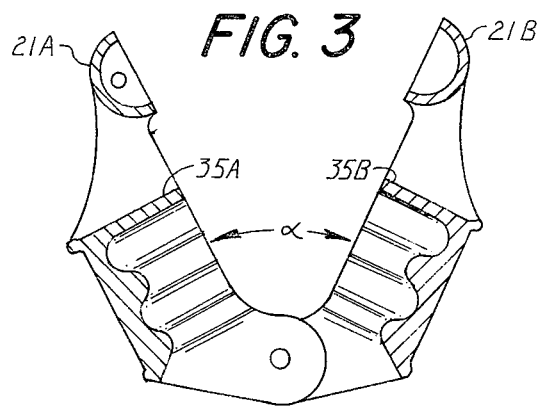
FIG. 5    FIG. 4
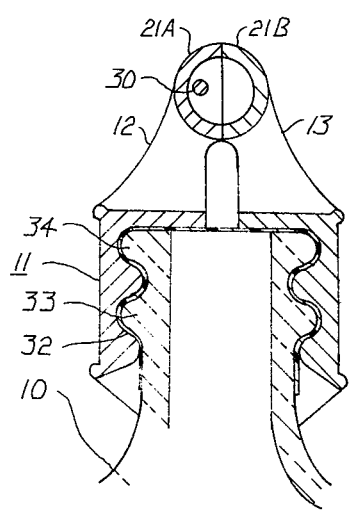
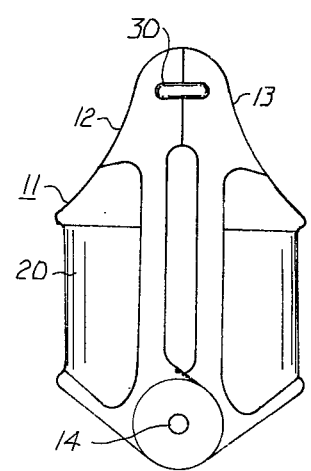
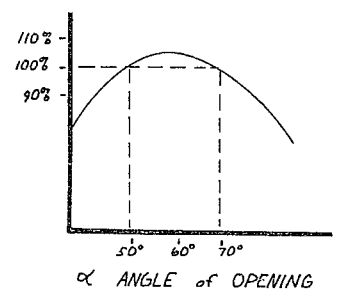
FIG. 6

BOTTLE CARRIER

BACKGROUND OF THE INVENTION

The storage and transportation of liquids in large glass or plastic bottles has been common not only in the chemical industry, but particularly in the bottled water field. The bottles typically are cylindrical with a flat base, a constricted neck having a diameter in the order of three inches and a cap or closure. A most common size of such bottle is a five gallon, which when filled, weighs in the order of fifty pounds. For anyone in the bottled water business or customers, the manipulation, juggling and carrying of these bottles is a challenge. Skilled deliverymen can carry two bottles over their shoulders grasping the necks and unload by flipping the bottles forward. Customers who try the same technique are likely to produce a smashed bottle, dangerous glass fragments, and a drenched floor. More conservative methods of carrying are to squat and lift the bottle in a barrel hold or other type of hold with equal danger.

Certain bottles have been transported enclosed in wire or metal frame sleeves having a handle. Such bottles are not easily sterilized or cleaned and the additional cost of the wire or metal carrier accompanying each bottle is disportionate to the value.

Various types of handles for such bottles may have been proposed, but to my knowledge, no such satisfactory bottle carrier has been developed.

BRIEF STATEMENT OF THE INVENTION

Faced with the foregoing, I have invented an improved bottle or jug carrier, designed to engage the neck of a bottle or jug and to hold it securely for carrying with one on each side of the carrier's body with his hands located approximately at hip level. This comfortable carrying position for one or two bottles simultaneously is accomplished where the carrier is of a generally clam shell shape with a hinged region including an opening which encircles the neck of the bottle. Virtually the entire throat and opening of the bottle is enclosed within the clam shell. Broad area contact is realized about the entire periphery of the throat region end opening enclosed. The handle is made up of two handle parts, one associated with each side of the clam shall and configured to provide a broad comfortable holding region aligned with the vertical axis of the bottle.

Characteristic of this invention is the fact that the opening between the handle parts varies in minimum transverse dimension as a function of the angle of opening of the clam shell handle. The opening is of lesser dimension than the lip diameter of the bottle when wide open. It only is of sufficient diameter to allow the lip of the bottle to pass through the opening when the handle is at a selected opening angle. This "pass through angle" is greater than the angle at which one hand can grasp both handle parts. Thus, the handle when installed on the bottle cannot slip off the bottle with the handles closed or partially open as might occur in normal carrying. Only a fully intentional broadening of the handle parts to a predetermined angle allows the handle to be removed.

In another embodiment of this invention, a safety latch is provided operable by the operators thumb and both visibly and tactilely determined to be in a locked condition.

BRIEF DESCRIPTION OF THE DRAWINGS

This invention may be more clearly understood from the following detailed description and by reference to the drawings in which:

FIG. 1 is a perspective view of a water bottle being carried employing this invention;

FIG. 2 is a side elevational view thereof;

FIG. 3 is a vertical sectional view of the handle of this invention opened ready for mounting on a bottle;

FIG. 4 is a front elevational view of the handle of this invention;

FIG. 5 is a vertical sectional view through the handle of this invention taken along line 5—5 of FIG. 2;

FIG. 6 is a graphical presentation of the jaw width of the handle of this invention as a function of angle of the opening; and FIG. 7 is a horizontal sectional view through the handle grip taken along lines 7—7 of FIG. 2.

DETAILED DESCRIPTION OF THE INVENTION

Now referring to FIG. 1, the conventional five-gallon water bottle is shown being carried by its neck from the carrier 11. Note that the bottle is located beside the leg of the carrying person in the position that he has full visibility of the bottle, and likewise his own visibility in walking while carrying the bottle is not obstructed. It is noted in FIG. 1 that the handle 11 encloses virtually the entire neck region and if as usually is the case the bottle has a metal or plastic cap, the cap itself is enclosed within the handle.

FIG. 2 shows greater detail of the handle, particularly notable is that the handle comprises a pair of parts, 12 and 13 which are pivoted about a pair of pins 14 and 15 one of which appears in FIG. 2. The handle parts 12 and 13 are each unitary and preferably of a light weight material of adequate strength such as cast aluminum. The handle is comprised basically of a jaw or entrance portion 16 between the lower extremities of the handle, a neck enclosing portion 20 and a hand grip portion 21. The hand grip 20 is split as are the neck engaging portions 20. In the normal carrying position the two hand grips parts 2A and 2B of generally semi-circular cross-section define a circular handle in the order of one inch diameter, a size which I have found is comfortable and minimizes fatigue for the carrier. A simple locking pin 30 extends out of the front and rear of grip 21.

Referring now to FIGS. 3 and 6, the handle 11 is shown in FIG. 3 in an open condition with the handle parts open at an angle of opening alpha. The two handle parts 12 and 13 have rotated about pins 14 and 15, the latter of which appears in FIG. 3.

The throat 16 varies in diameter as a function the angle alpha. FIG. 6 illustrates the range of the angle alpha in terms of the percentage of the diameter of the neck size of the bottle to be carried. FIG. 6 shows the throat 16 dimension to be smaller than 100% of the bottle neck diameter for all but a relatively narrow angular range, e.g. 50 to 70 degrees. Thus the handle may be placed over the neck of the bottle, or more important, removed therefrom only when the handle parts are spread within this angular range. When in this "pass through angle" the grip portions 21A and 21B are too far apart to be held by one hand. Thus the bottle cannot slip out of the handle as long as it is within the grasp of the carrier's hand.

When the handle 11 is attached to a bottle it assumes the condition illustrated in FIGS. 4 and 5. The two handle parts are locked together by locking device or pin 30. Note particularly in FIG. 5 that the handle parts 12 and 13 embrace the major portion of the neck of the bottle 10 and enclose its cap 32.

Typically bottles include at least one annular ring or lip such as integral rings 33 and 34. The handle parts 12 and 13 include matching recesses for the rings 33 and 34. Parts 12 and 13 also include integral web parts 35A and 35B which close the top of the bottle neck holding recess. Note that broad area contact is achieved between the bottle 10 neck and the handle 11. The local loading on the bottle is reduced while a solid grip is maintained. Where the bottle itself is of plastic material providing resiliency or the cap 32 is soft and resilient, the handle 11 may be of rigid material such as aluminum. I have found that the handle may be lined with resilient material such as rubber or vinyl or may be entirely a semi-resilient material such as high density polyethylene.

The simplicity of the locking pin 30 and its effectiveness is illustrated in FIG. 7. Pin 30 is "J" shaped with its body length greater than the length of the handle grip part 21A plus the length of its short leg. Pin 30 extends through two longitudinally aligned openings in the ends of grip part 21A. The short leg of pin 30 extends into or through a similar opening in part 21B.

The bent end of pin 30 is positioned in a thumb accessable part of the grip 21 so mere thumb pressure will cause pin 30 to move from the dashed position (unlocked) in FIG. 7 to the solid line (locked) position of the same figure. The handle must be fully closed for pin 30 to move to locked position. Pressure in the opposite direction on the exposed rear end of the pin 30 unlocks it.

Other types of locking mechanisms may be used but the pin 30 is extremely simple yet effective. Additionally its locked or unlocked condition is instantly determined both visually and by touch.

In summary, I have invented a truly effective handle for bottles which:

(1) provides broad area contact with the bottle neck for solid gripping with minimum local stress on the bottle neck;
(2) can not come off the bottle unless the handle is intentionally opened to a predetermined angle range;
(3) is comfortable to carry;
(4) includes a simple lock which is actuatable by the hand carrying the bottle; and
(5) is inexpensive to manufacture since made of two virtually identical parts.

The above described embodiments of this invention are merely descriptive of its principles and are not to be considered limiting. The scope of this invention instead shall be determined from the scope of the following claims, including their equivalents.

What is claimed is:

1. A bottle carrier comprising:
   a pair of handle parts defining a recess conforming substantially to the neck and lip of a bottle to be carried and an entrance portion;
   means pivotally connecting said handle parts together whereby said entrance portion varies in size as a function the angle between said handle parts;
   said entrance portion having a size larger than the largest size of the lip and neck portion of the bottle only at a limited angle range;
   said handle parts including grip portions which cooperate when said handle parts are pivoted together to define a grip for carrying by hand; and
   said handle part grip portions being spaced too great for carrying apart when said handle parts are pivoted to said limited angle range.

2. The combination in accordance with claim 1 wherein said limited angle range is in the order of 50 to 70 degrees.

3. claim 1 A bottle carrier comprising:
   a pair of handle parts defining a recess conforming substantially to the neck and lip of a bottle to be carried and an entrance portion;
   means pivotally connecting said handle parts together whereby said entrance portion varies in size as a function the angle between said handle parts;
   said handle parts including grip portions which cooperate when said handle parts are pivoted together to define a grip for carrying by hand;
   said handle part grip portions being spaced too great for carrying apart when said handle parts are pivoted to said limited angle range; and
   wherein said handle parts include substantially semi circular grip portions which define a generally circular grip when said handle parts are pivoted together.

4. claim 1 A bottle carrier comprising:
   a pair of handle parts defining a recess conforming substantially to the neck and lip of a bottle to be carried and an entrance portion;
   means pivotally connecting said handle parts together whereby said entrance portion varies in size as a function the angle between said handle parts;
   said handle parts including grip portions which cooperate when said handle parts are pivoted together to define a grip for carrying by hand;
   said handle part grip portions being spaced too great for carrying apart when said handle parts are pivoted to said limited angle range; and
   wherein said handle parts include a neck enclosing portion above said pivot means including at least one annular recess conforming to the lip of the bottle to be carried.

5. The combination in accordance with claim 3 including locking means engagable with said grip portions when said handle parts are pivoted together.

6. The combination in accordance with claim 5 wherein said locking means comprises a pin slidable along the length of one of said grip portions into and out of engagement with the other of said grip portions.

7. The combination in accordance with claim 6 wherein said locking means is a "J" shaped pin.

* * * * *